United States Patent [19]

Koves

[11] Patent Number: 6,146,519
[45] Date of Patent: Nov. 14, 2000

[54] GAS SOLID CONTACT RISER WITH REDISTRIBUTION

[75] Inventor: William J. Koves, Hoffman Estates, Ill.

[73] Assignee: UOP LLC, Des Plaines, Ill.

[21] Appl. No.: 09/151,593

[22] Filed: Sep. 10, 1998

Related U.S. Application Data

[63] Continuation-in-part of application No. 08/748,228, Nov. 12, 1996, abandoned.

[51] Int. Cl.⁷ .................................. C10G 11/16; B01J 8/08
[52] U.S. Cl. ........................... 208/146; 208/153; 208/156; 208/113; 422/214; 422/215
[58] Field of Search ..................................... 208/146, 153, 208/156, 113; 422/214, 215, 143

[56] References Cited

U.S. PATENT DOCUMENTS

| | | | |
|---|---|---|---|
| 3,071,540 | 1/1963 | McMahon et al. | 208/163 |
| 3,799,868 | 3/1974 | Gantt | 208/153 |
| 4,071,573 | 1/1978 | Owen et al. | 260/668 |
| 4,434,049 | 2/1984 | Dean et al. | 208/153 |
| 4,855,111 | 8/1989 | Bader et al. | 422/142 |
| 5,139,748 | 8/1992 | Lomas et al. | 422/140 |
| 5,453,254 | 9/1995 | Lefers et al. | 422/139 |

OTHER PUBLICATIONS

"Hydrodynamics of a Pilot–Plant Scale Regularly Packed Circulating Fluidized Bed," by A.G.J. van der Ham, W. Prins, and W.P.M. van Swaaij of Chemical Reaction Eng. Labs, Chemical Eng. Dept., Twente University, at an AIChE Symposium Series, Enschede, The Netherlands 1993, pp. 53–72.

*Primary Examiner*—Walter D. Griffin
*Attorney, Agent, or Firm*—John G. Tolomei

[57] ABSTRACT

An dilute phase transport riser for the contacting of particles with a gas uses redistributors along the length of the riser to prevent the formation of localized regions of high particle concentration along the wall of the riser. A series of redistributors extend transversely across the riser to redistribute the particles and the gas. The redistributor can comprise radially extended spokes or simple rectangular grates spaced at regular intervals along the length of the riser. The arrangement is particularly suited for FCC application where the catalyst tends to form pickets or streamers of catalyst that may slip backward along the length of a vertical riser.

14 Claims, 1 Drawing Sheet

6,146,519

GAS SOLID CONTACT RISER WITH REDISTRIBUTION

CROSS REFERENCE TO RELATED APPLICATION

This application is a continuation in part of U.S. Ser. No. 08/748,228, filed Nov. 12, 1996, now abandoned.

BACKGROUND OF THE INVENTION

1. Field of the Invention his invention relates generally to the contacting of hydrocarbon vapors with fluidized catalyst particles in a transport riser. More specifically this invention relates to a method of maintaining uniform dispersion of catalyst particles in a fluidized transport riser.

2. Description of the Prior Art

There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

One of the more important processes of this nature is the fluid catalytic cracking (FCC) process for the conversion of relatively high-boiling hydrocarbons to lighter hydrocarbons boiling in the heating oil or gasoline (or lighter) range. The hydrocarbon feed is contacted in one or more reaction zones with the particulate cracking catalyst maintained in a fluidized state under conditions suitable for the conversion of hydrocarbons.

It has been found that the method of contacting the feedstock with the catalyst can dramatically affect the performance of the reaction zone. Modem FCC units use a pipe reactor in the form of a large, usually vertical, riser in which a gaseous medium upwardly transports the catalyst in a fluidized state. Ideally the feed as it enters the riser is instantaneously dispersed throughout a stream of catalyst that is moving up the riser. A complete and instantaneous dispersal of feed across the entire cross section of the riser is not possible, but good results have been obtained by injecting a highly atomized feed into a pre-accelerated stream of catalyst particles. However, the dispersing of the feed throughout the catalyst particles takes some time, so that there is some non-uniform contact between the feed and catalyst as previously described. Non-uniform contacting of the feed and the catalyst exposes portions of the feed to the catalyst for longer periods of time which can in turn produce overcracking and reduce the quality of reaction products.

Much of the effort in improving the hydrocarbon conversion reactions in FCC units has focused on the objective of maximizing the initial dispersal of the hydrocarbon feed into the particulate catalyst suspension. Dividing the feed into small droplets improves dispersion of the feed by increasing the interaction between the liquid and solids. Preferably, the droplet sizes become small enough to permit vaporization of the liquid before it contacts the solids. Techniques such as agitation or shearing are used to atomize a liquid hydrocarbon feed into fine droplets which are then directed at the fluidized solid particles. A variety of methods is known for shearing such liquid streams into fine droplets.

U.S. Pat. No. 3,071,540 discloses a feed injection apparatus for a fluid catalytic cracking unit wherein a high velocity stream of gas, in this case steam, converges around the stream of oil upstream of an orifice through which the mixture of steam and oil is discharged. Initial impact of the steam with the oil stream and subsequent discharge through the orifice atomizes the liquid oil into a dispersion of fine droplets which contact a stream of coaxially flowing catalyst particles.

U.S. Pat. No. 4,434,049 shows a device for injecting a fine dispersion of oil droplets into a fluidized catalyst stream wherein the oil is first discharged through an orifice onto an impact surface located within a mixing tube. The mixing tube delivers a cross flow of steam which simultaneously contacts the liquid. The combined flow of oil and steam exits the conduit through an orifice which atomizes the feed into a dispersion of fine droplets and directs the dispersion into a stream of flowing catalyst particles.

U.S. Pat. No. 5,139,748 issued to Lomas et al. shows the use of radially directed feed injection nozzles to introduce feed into an FCC riser. The nozzles are arranged in a circumferential band about the riser and inject feed toward the center of the riser. The nozzle arrangement and geometry of the riser maintains a substantially open riser cross-section over the feed injection area and downstream riser sections.

Feed atomization, lift-gas and radial injection of feed have been used to more uniformly disperse feed over the cross-section of a riser reaction zone. While it may be possible to obtain a good initial dispersal of the catalyst particles as they contact the vaporized feed, it has been found that as the catalyst passes further up the transport riser it tends to form ribbons or bands of concentrated catalyst that hug the wall of the riser. As feed contacts the hot catalyst, cracking and volumetric expansion of the hydrocarbons causes an increase in the volumetric rate of fluids passing up the riser. A large portion of this volumetric increase occurs immediately downstream of the feed injection point. Downstream of the feed distributor this volumetric expansion occurs in a relatively uncontrolled fashion. The uncontrolled volumetric expansion occurring simultaneously with mixing of catalyst and hydrocarbon feed results in mal-distribution that adversely effects the quantity and quality of the products obtained from the cracking reaction. This maldistribution is believed to be caused by turbulent back mixing as well as quiescent zones in the riser section immediately downstream of the feed injection point.

These flowing ribbons of catalyst cause non-uniform regions of density and result in uneven contacting of the catalyst with the hydrocarbon feed. These ribbons of catalyst produce slippage between the fluid stream and the catalyst stream that further increase the nonuniformity of the contacting between catalyst and vapors. All of these phenomena contribute to an increase in the non-uniformity of the contacting between the catalyst and the gas.

It is known to use screens and obstacles in conduits that transport particulate material. U.S. Pat. No. 4,071,573 shows the use of screens to disperse bubbles that form in the dense phase transport and contacting of catalyst and a feedstream. U.S. Pat. No. 3,799,868 discloses a riser for the dilute phase contacting of gaseous hydrocarbons that blocks the center of the riser to eliminate the central area of the riser as a potentially more dilute flow area. It is also taught to intensify gas solids contacting by placing large obstacles in the path of circulating gas solids stream. "Hydrodynamics of a Pilot-Plant Scale Regularly Packed Circulating Fluidized Bed," was presented at an AIchE Symposium Series by A. G. J. van der Ham, W. Prins, and W. P. M. van Swaaij of Chemical Reaction Eng. Labs, Chemical Eng. Dept., Twente University, The Netherlands in 1993.

SUMMARY OF THE INVENTION

It is an object of this invention to provide a method and apparatus for reducing or eliminating non-uniformity in the density of the catalyst and gas mixture both downstream and upstream of the feed injection zone.

It is a further object of this invention to maintain well distributed catalyst over the entire cross section of a riser conduit both downstream and upstream of a location where the feed is injected.

Establishing and maintaining uniformly distributed catalyst has the added benefit of reducing backmixing. Backmixing results from the refluxing action brought about by regions of higher density catalyst. In particular the dense phase catalyst causes downflow of catalyst to occur at the walls of a riser.

These objects are achieved in a riser conduit that transports gas and particles by the use of redistributors over a specified length of the riser. The redistributors may provide a redistribution section that breaks up pickets and streamers of catalyst that tend to hug the wall of the riser with a ring of inwardly projecting spokes. This type of arrangement minimizes any disruption or interference with the flow of the catalyst through the riser. The redistributors may provide more complete dispersal of the catalyst by extending transversely over the cross section of the riser at periodic intervals to provide a uniform resistance over the cross section of the riser at the axial location of each redistributor. This type of redistributors can comprise open grates that provide a rectangular grid of openings for the passage of particles and fluid. Cross members defining the grids provide a distributed resistance. The addition of the distributed resistance across the riser and along its length provides better more uniform gas—particle contact. In catalytic processes such as the fluid catalytic cracking of hydrocarbons the use of the redistributors can result in shorter risers, reduced residence time, and improved selectivity and conversion.

The redistributors of this invention maintains a more uniform velocity of the particles and gases after their initial mixture and acceleration in both the lift and reaction zones. The redistributors of the present invention will introduce additional turbulence and pressure drop in the riser at redistributor location. Turbulence has generally been avoided in FCC risers since it is associated with maldistribution and backmixing. However since the general flow of gases and catalyst has been established the small amount of turbulence needed for effective redistribution will not disrupt flow to the degree of causing undesirable backmixing. Redistributors spaced at regular intervals can also accomplish the redistribution while imposing very little pressure drop on the overall length of the riser.

The redistribution sections are further characterized by a relatively open area that imposes little additional pressure drop on the system. The redistributor will leave at least 50% of the riser cross sectional area open for fluid and particle flow and will more preferably leave at least 60% of the area open for such flow. The use of radial spokes that ring the wall of the riser are particularly advantageous in keeping most of the riser cross section open for fluid and particle flow.

The number and spacing of the redistributors can be optimized for a given design configuration. When revamping older units, the redistributors will typically only extend to the location where complete reaction of the feed has been achieved. Beyond that point separation of the catalyst and gas is usually desirable.

Accordingly, in a specific embodiment, this invention is a method of contacting fluidized particles with a fluid feed stream comprising hydrocarbons. The method combines fluidized particles and a fluid feed stream in an upstream section of a riser conduit to accelerate the particles up the conduit and produce a dilute phase mixture of particles and gas that flows through the riser. The dilute phase mixture passes along the riser and through at least one redistribution section that extends transversely into the riser. The mixture is recovered from the end of the riser. The riser is preferably a vertically oriented riser conduit and so that the dilute phase mixture is formed in a lower section of the conduit.

In a more specific method embodiment, this invention is a method of contacting fluidized particles with a fluid feed stream comprising hydrocarbons that combines fluidized particles and a fluid feed stream in an upstream section of a riser conduit having a substantially open interior. The particles are accelerated up the conduit which produces a dilute phase mixture of particles and gas that flows through the riser. The dilute phase mixture passes through the riser at a superficial velocity of at least 10.0 ft/sec, with an average mixture density in the riser conduit of less than 20 lb/ft$^3$, through at least one redistribution section that includes a plurality of spokes extending inwardly from the wall of the riser for a radial distance of at least 2 inches. Each distribution section provides at least four spokes in each quadrant of the riser. The method recovers the mixture from the end of the riser.

Additional objects, embodiments and details of this invention can be obtained from the following detailed description.

DETAILED DESCRIPTION OF THE INVENTION

This invention will be described in the context of an FCC process for the catalytic cracking of hydrocarbons by contact with a fluidized catalyst.

Figure 1:
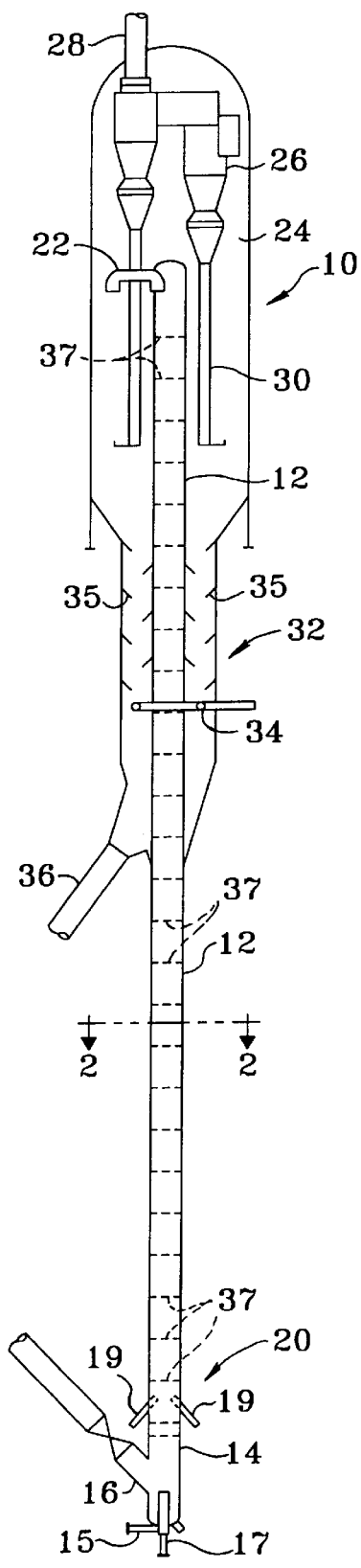
FIG. 1 is a sectional elevation of an FCC reactor and riser.

In a typical FCC process flow arrangement, finely divided regenerated catalyst leaves a regeneration zone and contacts a feedstock in a lower portion of a reactor riser zone. FIG. 1 shows a reactor 10 with a vertical riser 20 having an upper section 12 and a lower riser portion 14 into which a regenerator standpipe 16 transfers catalyst from the regenerator (not shown). A fluidizing medium in the form of a steam or a light hydrocarbon stream enters the riser through a conduit 17 to begin acceleration of the catalyst up the riser. The amount of fluidizing medium entering the riser through conduit 17 may be limited to maintain dense phase conditions in the lower portion of the riser. Additional amounts of steam may be injected into the riser through conduit 15. Dense phase conditions for the fluidized catalyst are typically characterized by a mixture density of at least 20 lb/ft$^3$. Additional fluidizing medium in the form of a hydrocarbon feed enters the riser through conduits 19. Conduits 19 will typically include nozzles at the end of the conduits for atomizing the feed as it exits the conduits. However, some commercial units inject the feed through a central conduit similar to conduit 17 and do not provide elevated feed injection as provided by conduits 19. While the resulting feed mixture, which has a temperature of from about 200° C. to about 700° C. and more typically to about 560° C., passes up through the riser, conversion of the feed to lighter products occurs and coke is deposited on the catalyst. The effluent from the riser is discharged from the top of the riser through a disengaging arm 22 into a disengaging space 24 where additional conversion can take place. The hydrocarbon vapors, containing entrained catalyst, are then passed through one or more cyclone separators 26 to separate any spent catalyst from the hydrocarbon vapor stream.

The separated hydrocarbon vapor stream is passed from an outlet nozzle 28 into a fractionation zone (not shown) known in the art as the main column wherein the hydrocarbon effluent is separated into such typical fractions as light gases and gasoline, light cycle oil, heavy cycle oil and slurry oil. Various fractions from the main column can be recycled along with the feedstock to the reactor riser. Typically, fractions such as light gases and gasoline are further separated and processed in a gas concentration process located downstream of the main column. Some of the fractions from the main column, as well as those recovered from the gas concentration process may be recovered as final product streams.

The separated spent catalyst from cyclones 26 passes into the lower portion of the disengaging space through dip legs 30 and eventually passes out of the reaction zone passing into a stripping zone 32. A stripping gas, usually steam, enters a lower portion of zone 32 through a distributor ring 34 and contacts the spent catalyst, purging adsorbed and interstitial hydrocarbons from the catalyst. A series of baffles 35 in the stripping zone improves contact between the catalyst and stripping gas.

The spent catalyst containing coke leaves the stripping zone through a reactor conduit 36 and passes into the regeneration zone where, in the presence of fresh regeneration gas and at a temperature of from about 620° C. to about 760° C., combustion of coke produces regenerated catalyst and flue gas containing carbon monoxide, carbon dioxide, water, nitrogen and perhaps a small quantity of oxygen. Usually, the fresh regeneration gas is air, but it could be air enriched or deficient in oxygen. Flue gas is separated from entrained regenerated catalyst by cyclone separation means located within the regeneration zone and separated flue gas is passed from the regeneration zone, typically, to a carbon monoxide boiler where the chemical heat of carbon monoxide is recovered by combustion as a fuel for the production of steam, or, if carbon monoxide combustion in the regeneration zone is complete, the flue gas passes directly to sensible heat recovery means and from there to a refinery stack. Regenerated catalyst which was separated from the flue gas is returned to the lower portion of the regeneration zone which typically is maintained at a higher catalyst density. A stream of regenerated catalyst leaves the regeneration zone, and in repetition of the previously mentioned cycle, contacts the feedstock in the reaction zone.

The particulate material used in these processes will typically comprise finely divided catalysts that include those known to the art as fluidized catalytic cracking catalysts. Specifically, the high activity crystalline aluminosilicate or zeolite-containing catalysts can be used and are preferred because of their higher resistance to the deactivating effects of high temperatures, exposure to steam, and exposure to metals contained in the feedstock. Zeolites are the most commonly used crystalline aluminosilicates in FCC.

Catalyst entering the lower section 14 of the riser conduit preferably forms a dense catalyst bed. Once the catalyst is mixed with the feed entering via nozzles 19 it will form a dilute phase catalyst regime. The dilute phase catalyst regime is characterized by a lower mixture density. Typical average mixture density in the dilute phase regime will be less than about 20 lb/ft$^3$. In addition particles and gas in the dilute phase regime will have a higher superficial velocity. This velocity will usually be at least 10 ft/sec and more often at least 40 ft/sec. It is the higher velocities and the lower catalyst density that leads to the formation of the catalyst streamers or ribbons as previously described.

A series of redistribution sections containing redistributors 37 extend transversely across the cross section of riser 12 to break up any ribbons of particulate material that may form as the gas and particles pass upward through the riser. As few as one or two redistributors over the length of the riser will has a substantial impact on reducing the formation of the continuation of localized catalyst streams. For a single redistributor the most beneficial location may be one or two riser diameters above the feed injection conduits 19. Regular spacing of the redistribution grids up the length of the riser will maintain nearly uniform distribution of particles and gas over the entire cross section of the riser. To achieve a uniform distribution of the gas and catalyst mixture the redistributors are preferably spaced at regular intervals along a desired length of the riser. As stated previously the distributors are most beneficial in the section of the riser immediately upstream of the location where the feed is injected into the riser and downstream of the feed injection location where reaction is desired. Although any spacing can be used for the redistributors, the redistributors will preferably have a spacing along the length of the riser proportionately equal to about two riser diameters or less.

The number of redistributor grids may be limited to reduce pressure drop. The redistributors 37 are essentially planar and provide open areas for the particles and gases to pass through. Pressure drop limitations may restrict the number of redistributors. Preferably the grids have a high percentage of open area to minimize pressure drop through the riser. The grid may have any configuration that provides a high percentage of open area and preferably includes members that traverse the entire cross section of the riser.

The redistribution sections provide a high percentage of open area across the entire transverse cross section of the riser. Thus the central area of the riser has an open area equal to a 50% of its nominal area with nominal open areas of at least 60 to 70% across the central section of the riser being particularly preferred. The redistribution sections also provide a relatively open area across each portion of the riser where the redistributor is placed. Accordingly each unit area of the redistributor, i.e. that area of the grid that defines a single regular opening of the grid, will block less than 50% of corresponding area of the riser at any location across the riser. The term regular unit area excludes those areas where the grid intersects the wall of the riser and thereby defines irregular shaped openings. Again any regular unit area of the grid will preferably block less than 30 to 40% of corresponding area of the riser.

Figure 2:
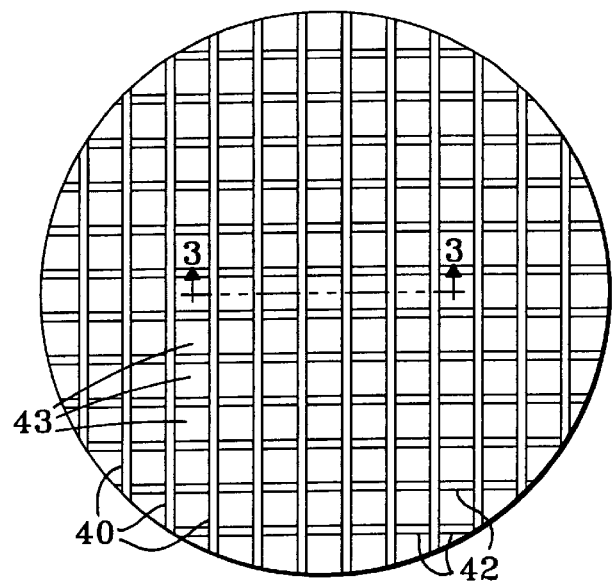
FIG. 2 is an enlarged section taken across the riser above one of the redistributor grids.

FIG. 2 shows a preferred redistributor configuration. The redistributor consists of a plurality of linear member 40 arranged orthogonally to another set of parallel members in a substantially planar arrangement of rectangular grid openings 43. The rectangular grids preferably have 2 to 4 inch square openings and are defined by relatively narrow bars. The redistribution section can comprise a plurality of radially oriented rods with open spaces between rods of 2" to 4" about the circumference of the riser. In order to provide the desired open area the members 40 defining the openings will have a smaller horizontal width than the minimum dimension across a regular shaped opening 43. The unit area for such a grid equals the area of any square opening measured about the centerline of the linear members 40 that define the opening. The ends of members 40 that contact the walls serve as spokes that have a radial extension into the riser and a location near the wall of the riser to break up any concentrated streams of particles near the wall of the riser.

Figure 3:
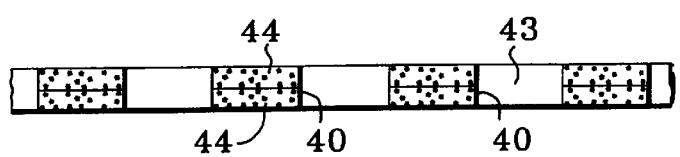
FIG. 3 shows a planar view of a redistributor grid.

The dilute phase flow of particulate material at high velocity creates a highly erosive environment. Therefore, the redistributors are designed to resist erosion. Erosion resistance may be provided by constructing the redistributors from ceramic materials. Alternately FIG. 3 shows a cross section of a grid arrangement where the grid has been constructed from horizontal bars 40 and 43 that retain an erosion resistant material 44 on the upstream and downstream portions of the bars. Erosion resistant materials are well known to those skilled art and generally comprise abrasion resistant refractories that readily cast in place on both sides of the bars using well known anchoring techniques. Where abrasion materials are cast on to the horizontal members of the grids, the grid bars will usually have a width of at least 1" to provide adequate surface for anchoring the refractory to the bars. For bars with a 1 inch width the grid openings will preferably have a minimum dimension of at least 2.5 inches.

Figure 4:
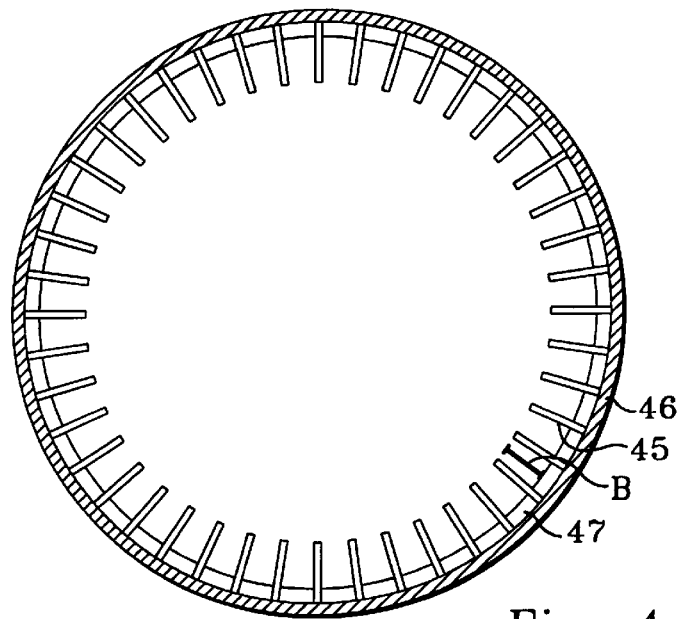
FIG. 4 shows a planar view of an alternate redistributor arrangement.

The essential objective of breaking up concentrated streams of catalyst near the wall of the riser may be achieved with a simplified redistribution section as shown in FIG. 4. In FIG. 4 a plurality of spokes 45 extend radially inward from a riser wall 46 to provide a redistribution section in the form of a ring. The ends of spokes 45 typically extend at least 2 inches into the riser from the inside of an abrasion resistant lining 47 (See dimension B) that covers the interior wall riser 56. Rod or plate elements may provide the spokes. Preferably plate elements will have an orientation parallel to the flow direction through the riser. This orientation avoids imparting tangential velocity to the fluid and particles that can directionally serve to concentrate the relatively heavier catalyst particles back against the wall of the riser. The arrangement of FIG. 4 leaves the center of the riser completely open for fluid and particle flow while breaking up catalyst that travels near the wall of the riser and that has been discovered to be the most problematic.

The number of spokes in a riser section will vary with the size of the riser. Preferably the spokes will have a minimum circumferential spacing around the riser of at least 2 inches and a maximum open spacing between spokes of 4 inches. This maximum spacing eliminates any relatively large sectors where the streamers of catalyst may flow uninterrupted along the riser wall. The minimum spacing provides enough of a flow area so that the entire transverse area of the riser is still used effectively. For purposes of definition, the unit area for the spoke arrangement can consist of the truncated sector bordered on the sides by the centerline of the spokes and extending from the inside of the lining to the inner end of the spokes.

The spoke type of arrangement may be used with multiple redistribution section. The multiple redistribution section may use the same configuration of redistributor at all grid location or may change the configuration of the redistributor at different redistributor locations. When each redistributor configuration is substantially the same it is advantageous to angularly offset the adjacent redistribution sections. For example the linear members of grid type redistributors are preferably rotated about 45° with respect to adjacent grid members to vary the pattern of openings presented to the stream as it flows up the riser. In a similar manner spokes of adjacent redistributors are preferably offset along the length of the riser to vary the pattern of spokes presented to the flowing particle stream.

What is claimed is:

1. A method of contacting fluidized particles with a fluid feed stream comprising hydrocarbons, said method comprising:

a) combining fluidized particles and a fluid feed stream in an upstream section of a riser conduit having a substantially open interior to accelerate said particles up said conduit and produce a dilute phase mixture of particles and gas that flows through said riser;

b) passing said dilute phase mixture along said riser at a superficial velocity of at least 10.0 ft/sec, with a mixture density in said riser conduit of less than 20 lb/ft$^3$, through at least one redistribution section that includes a plurality of rods extending inwardly from the wall of the riser for a radial distance of at least 2 inches wherein each redistribution section provides at least four rods in each quadrant of the riser and leaves at least 70% of the riser area open; and c) recovering said mixture from the end of said riser.

2. The method of claim 1 wherein said riser is a vertically oriented riser conduit and said dilute phase mixture is formed in a lower section of said conduit.

3. The method of claim 1 wherein said redistribution sections are spaced along the length of said riser at intervals of less than two riser diameters.

4. The method of claim 1 where in said redistribution section comprises a plurality of radially oriented rods with open spaces between rods of 2 to 4 inches about the circumference of the riser.

5. The method of claim 1 wherein said mixture has a superficial velocity of at least 40 ft/sec.

6. The method of claim 1 wherein said fluid feedstream enters said riser conduit from a feed conduit fixed to the bottom of said riser conduit.

7. A method of contacting fluidized catalyst particles with a feed stream comprising liquid hydrocarbons, said method comprising:

a) combining fluidized particles and a liquid hydrocarbon stream in an upstream section of a vertically extending riser conduit to produce a dilute phase stream of catalyst and vaporized hydrocarbons;

b) passing said stream upwardly through said riser at a velocity of at least 10 ft/sec;

c) passing said dilute phase stream upwardly along said riser and through a series of redistribution sections comprising planar grids that extend transversely across said riser at intervals of less than twice the diameter of the riser, that have openings with a minimum opening dimension of at least 2 inches away from the wall of the riser, that leave at least 70% of the riser open area and that contact the wall of the riser at a maximum open spacing of 4 inches between grid members about the circumference of the riser; and, d) discharging said mixture from the end of said riser for separation of hydrocarbons from catalyst and recovering of a cracked hydrocarbon product.

8. The method of claim 7 wherein at a location away from the wall of the riser said redistribution grids have openings with a minimum transverse dimension of 2.5".

9. An apparatus for contacting fluidized particles with a gas, said apparatus comprising:

a) an elongated riser conduit having an upstream and a downstream end;

b) means for adding particles and fluidizing medium to said upstream end;

c) means for distributing said fluidizing medium in said particles and producing a dilute phase catalyst mixture; and, d) at least one redistributor located between said means for distributing said fluidizing medium and said downstream end, said redistributor comprising a substantially open planar structure that extends circumferentially around said riser and that defines a unit area that blocks less than 30% of the corresponding area across any portion of the riser and, said redistribution including at least four rods in each quadrant of the riser that extend from the wall of the riser into the riser by a radial distance of at least 2 inches for passage of said mixture through said redistributor.

10. The apparatus of claim 9 wherein said apparatus comprises at least two redistributors and the rods of adjacent redistributors are offset with respect to each other to vary the pattern of rods presented to the stream as it flows up the riser.

11. The apparatus of claim 9 wherein said redistributor comprises a rectangular grid defining rectangular openings that extend transversely across the riser.

12. The apparatus of claim 11 wherein said apparatus comprises at least two redistributors and adjacent rectangular grids are rotated about 45° with respect to adjacent rectangular grids to vary the pattern of openings presented to the stream as it flows up the riser.

13. The apparatus of claim 11 wherein the minimum opening dimension of said grid openings, other than at the wall of the riser, are between 2" to 4".

14. The apparatus of claim 9 wherein a plurality of redistributors are located along the riser at regular intervals of less than twice the diameter of the riser.

* * * * *